US010402037B1

(12) United States Patent
Van Gorkom et al.

(10) Patent No.: US 10,402,037 B1
(45) Date of Patent: Sep. 3, 2019

(54) OPTIMIZATIONS FOR A LOCK SCREEN

(71) Applicant: Amazon Technologies, Inc., Reno, NV (US)

(72) Inventors: Michael Eric Van Gorkom, Redmond, WA (US); Alexander Gregory Wipf, Seattle, WA (US); Aidan Nicholas Low, Seattle, WA (US); Enrique de la Garza Villarreal, Sammamish, WA (US); Timothy Scott Pinkawa, Seattle, WA (US); Alexander David Evans, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 670 days.

(21) Appl. No.: 14/983,344

(22) Filed: Dec. 29, 2015

(51) Int. Cl.
*G06F 3/0481* (2013.01)
(52) U.S. Cl.
CPC .................... *G06F 3/0481* (2013.01)
(58) Field of Classification Search
CPC combination set(s) only.
See application file for complete search history.

(56) References Cited

U.S. PATENT DOCUMENTS

| | | | |
|---|---|---|---|
| 2006/0156256 A1* | 7/2006 | Lee .................. | H04M 1/72544 715/857 |
| 2007/0033531 A1* | 2/2007 | Marsh .............. | G06F 17/30864 715/738 |
| 2008/0077504 A1* | 3/2008 | Gausebeck ........... | G06Q 30/02 705/26.1 |
| 2012/0278174 A1* | 11/2012 | Seo ................ | G06Q 30/02 705/14.59 |
| 2013/0007665 A1* | 1/2013 | Chaudhri ............ | H04L 51/24 715/830 |
| 2013/0050250 A1* | 2/2013 | Brinda .............. | H04M 1/72544 345/619 |
| 2014/0195353 A1* | 7/2014 | Govan .............. | G06Q 30/0267 705/14.64 |
| 2014/0201675 A1* | 7/2014 | Joo ................ | G06F 3/0481 715/784 |
| 2015/0133199 A1* | 5/2015 | Lee ................ | G06Q 30/0241 455/566 |
| 2015/0170211 A1* | 6/2015 | de Souza ........... | G06Q 30/0267 705/14.54 |

(Continued)

*Primary Examiner* — Hien L Duong
(74) *Attorney, Agent, or Firm* — Hogan Lovells US LLP

(57) ABSTRACT

Approaches are described for determining and displaying recommended content on a lock screen of a computing device. For example, a lock screen can include recommended content that can display user-specific offers and/or other information determined to be relevant to the user. One of a full-screen template, a banner template, or a notification template include the recommended content. The recommended content can include selectable elements that, when selected, can cause the computing device to perform an action such as launching an application, providing additional displays, etc. Using display information, the computing device can determine a display schedule, whereby the display schedule can be used to set a frequency at which the recommended content is displayed, a time at which the recommended content is displayed, the type of template used to express the recommended content, placement of the recommended content on a display screen, among other such display options.

20 Claims, 6 Drawing Sheets

(56) References Cited

U.S. PATENT DOCUMENTS

| | | | |
|---|---|---|---|
| 2015/0310493 A1* | 10/2015 | Chitnis | G06Q 30/0267 |
| | | | 705/14.64 |
| 2016/0379279 A1* | 12/2016 | Ashery | G06Q 30/0276 |
| | | | 705/14.72 |
| 2017/0004126 A1* | 1/2017 | Li | G06F 17/248 |
| 2017/0046024 A1* | 2/2017 | Dascola | H04M 1/72522 |
| 2017/0331941 A1* | 11/2017 | Zeng | H04M 1/72566 |
| 2018/0107364 A1* | 4/2018 | Sihn | G06F 3/04883 |
| 2018/0197575 A1* | 7/2018 | Doherty | G06Q 30/0276 |

\* cited by examiner

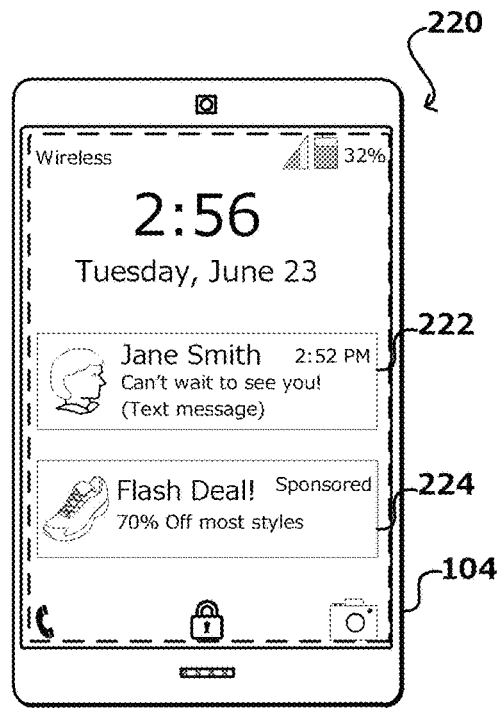
FIG. 2A
FIG. 2B
FIG. 2C

OPTIMIZATIONS FOR A LOCK SCREEN

BACKGROUND

Mobile electronic devices, such as smart phones, tablet computers, and wearable computing devices (e.g., watches, glasses, among others) are becoming more and more ubiquitous. People are increasingly using their mobile devices to obtain the information for going about their everyday lives. As people spend a greater amount of their time on these devices, it can be helpful to people if their devices offered suggestions of media content or physical items that might be of interest. Discussed herein are technical solutions to provide improved systems for displaying services and goods available to people.

BRIEF DESCRIPTION OF THE DRAWINGS

Various embodiments in accordance with the present disclosure will be described with reference to the drawings, in which:

FIGS. 2A, 2B, and 2C illustrate example templates to display recommended content that can be displayed on a lock screen of a computing device in accordance with various embodiments;

DETAILED DESCRIPTION

Systems and methods in accordance with various embodiments of the present disclosure may overcome one or more of the foregoing or other deficiencies experienced in conventional approaches for presenting content, such as advertisements, via an electronic device. In particular, various embodiments provide for determining and displaying recommended content on a lock screen of a touch-sensitive computing device. For example, a lock screen can include recommended content that can include advertisements and/or other such information. The recommended content can be displayed in one of a number of templates (e.g., full-screen template, notification template, or banner template) and can include selectable elements that, when selected, can cause the computing device to perform an action such as launching an application, providing additional displays, etc.

In various embodiments, display instructions, recommended content, and/or templates to display the recommended content can be associated with a content provider and stored on a computing device. The recommended content can be tailored to a user of the computing device. For example, as will be described further herein, the recommended content inserted into the templates can be based on the geographic location of the computing device, usage data as relating to social media applications associated with the user of the computing device, web applications, and various other applications, search queries, purchase history, among other types of information. The display instructions can be executed by the computing device to determine a display schedule, whereby the display schedule can be used to set a frequency at which the recommended content is displayed, a time at which the recommended content is displayed, the type of template used to express the recommended content, placement of the recommended content on a display screen, among other such display options. As the user interacts with the recommended content (e.g., selects the content) and/or device, a user profile that includes usage information can be created and/or updated, and the user profile can be used to manage the display schedule such that recommended content is provided in accordance with the display schedule. In response to a selection of the recommended content, the computing device can perform at least one action, such as launching a web browser to view a product listing of an item or service represented in the recommended content, navigating to a particular web site, launching an application, or performing some other action.

Various other functions and advantages are described and suggested below as may be provided in accordance with the various embodiments.

Figure 1A:
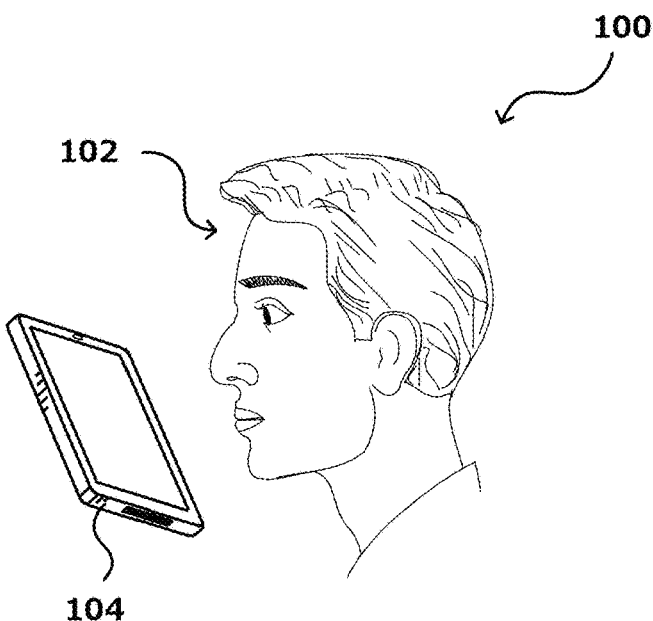
FIGS. 1A and 1B illustrate an example implementation where a user is interacting with an ad-supported computing device in accordance with an embodiment.

FIG. 1A illustrates an example implementation 100 where a user 102 is interacting with a computing device 104, in accordance with an embodiment. Although a portable computing device (e.g., an electronic book reader, smart phone, or table computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, wearable computers (e.g., watches, glasses, etc.) and portable players, among others. In this example, the computing device can have executing thereon a content rendering service that can cause recommended content to be displayed on a lock screen of the computing device 104. In accordance with various embodiments, a lock screen is a type of graphical user interface (GUI) that is displayed on a touch-sensitive display screen when the display screen is "locked," or programmed not to respond to most touches on the display screen. For example, the lock screen can regulate immediate access to the computing device by requiring a certain action in order to receive access: such as entering a password, using a certain button combination, or by performing a certain gesture using a device's touchscreen. Functionality of the computing device and private data is limited to pre-configured access settings that are determined either by default or when the computing device is unlocked.

Figure 1B:
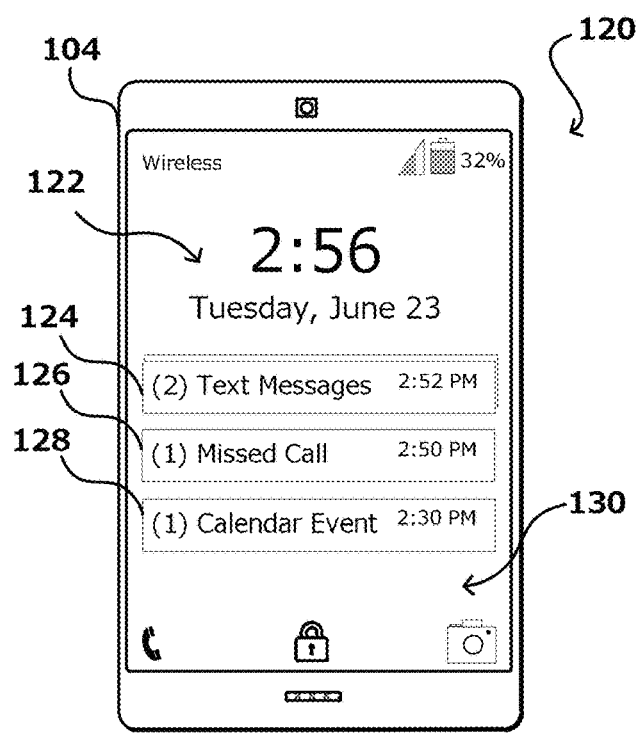

The lock screen can be displayed upon detecting an input that "wakes" the display screen. An example input can be a selection of a physical button, a voice input, movement of the computing device 104, an input from a different computing device (e.g., a smart watch), etc. The lock screen can be unlocked to enable certain computing device settings and other computing device functionality. Unlocking the computing device can include, for example, verifying the user's identification with a passcode, using facial identification approaches to verify the user's identity, using fingerprint recognition approaches to verify the user's identity, using voice identification approaches to verify the user's identity, etc.). Recommended content can include, for example, rich media content, advertisements, graphics, text, selectable elements, etc. Upon waking the computing device, the display screen caused to be powered on and the lock screen is displayed. As shown in example 120 of FIG. 1B, the lock screen can display, for example, the time and date 122, notifications for various applications executing on the computing device such as missed text notifications 124, missed call notifications 126, calendar event notifications 128, etc.; a background image (i.e., wallpaper); interactive elements 130 that can include a call icon to place a call, an unlock icon to unlock the computing device, a camera icon to capture a picture, status elements that indicate a Wi-Fi connection, telecomm connection, battery level, etc., among other types of information.

In accordance with various embodiments, the lock screen can additionally be utilized to display recommended content in templates. The recommended content can be displayed instead of (or addition to) the background of the lock screen. The recommended content can include, for example, rich media content, advertisements, and other content a user or other object can interact with. The recommended content can include a hypertext link or other selectable element that can enable the computing device to launch a web browser, navigate to a particular web site, launch an application, or perform some other action. The page can be a product page that displays information associated with the recommended content as well as provide the ability to purchase an item represented on the product page. As will be described further herein, the recommended content can be displayed in accordance with a display schedule. The display schedule can be used to cause the computing device to display the recommended content at specific times, under specific conditions, and/or in response to an event. For example, the computing device can determine that a current time of day is within a determined time segment specified by the display schedule to cause the recommended content to be displayed. A content provider can provide such recommended content along with display instructions to the computing device. Thereafter, the computing device can cause the recommended content to be displayed on the lock screen in one or more of a number of different visual representations. Advantageously, proving the right visualization method for a specific user at the right moment can maximize advertisement and other revenue.

FIG. 2A illustrates an example 200 of a full-screen template that includes recommended content that can be displayed on a lock screen of a computing device 104. In this example, the background image portion 204 of the lock screen has been replaced with full-screen template 206 that includes recommend content, which in this example includes a display of a shoe, text, and an interactive element 208. The background image portion 204 can be a digital image (photo, drawing etc.) used as a decorative background of a graphical user interface on the lock screen of the computing device 104 or other electronic device. It should be noted that although most devices come with a default background, users or other processes can change the background. As described, the recommended content can be inserted in one of a number of templates (e.g., full-screen template, notification template, or banner template) and the recommended content can be displayed on the lock screen of the computing device. A template can be used to provide a standard layout and look and feel within content regions of the lock screen or other display areas. The layout can include regions or areas, and content can be inserted into those regions. Inserting content can include referencing particular content to be displayed in the regions of the template.

The interactive element 208, when selected, can cause the computing device to perform one of a number of actions. Example actions include launching an application such as a web browser to view a webpage, an application marketplace to download an application, among others. In this example, the interactive element can cause a mobile shopping app to launch, wherein a product page for the shoe as well as any additional or related information can be displayed. In the situation where the user has a passcode or other security measure securing the computing device, the user would first have to provide the necessary passcode before viewing the product page. On the product page, the user can purchase the product, search additional products, or resume operation of the computing device. It should be noted that although the recommended content in the full-screen template is shown in this example, it will be appreciated that the visual representation of the recommended content is not limited to the full-screen template. For example, the recommended content can be displayed in a non-full screen template which includes but is not limited to a banner template, a notification template, or any other template that utilizes substantially less than all of the pixels of the display screen when rendered. As will be appreciated by one of ordinary skill in the art, a product or other content to be represented in recommended content can be a tangible item, a virtual item, a service, or a combination thereof.

FIG. 2B illustrates example 220 of notification template 222 that includes recommended content that can be displayed on a lock screen of the computing device. In this example, the notification template is intended to match a style of the notifications used by the computing device. As shown, the recommended content is displayed with a text message 224, and appears as though it could be another text message displayed along with the text message. Although the recommended contented is displayed with a text message notification, notification template 222 can be the only notification displayed, or displayed with one or more other notifications, as may include missed call notifications, missed text message notifications, calendar event notifications, etc. Notification template 222 includes recommended contented which may include a graphical representation of an advertisement, a description associated with the advertisement, and any other appropriate information such as a label distinguishing the provided advertisement from other device generated notifications. In this example, recommended content in the notification template includes an image of a shoe with information indicating that the product is on sale. A user can interact with the recommended content. For example, the user can tap, select, swipe, or otherwise interact with the recommended content in a same or similar manner as with other notifications. Selecting the recommended content can cause the computing device to display additional information, launch an application, or perform some other action.

In another example, a banner template 242 can include recommended content as shown in example 240 of FIG. 2C. Although the recommended content displayed in a banner template is displayed with a text message 220, the recommended content can be displayed with any number of types of notifications. Further, like the recommended content displayed in a notification template, the recommended content can be displayed after all other notifications, before all other notifications, or somewhere mixed in with any other notifications. The visual representation of banner template 242 generally utilizes a larger area of the lock screen and is emphasized with respect to other displayed notifications. For example, the banner template 242 can appear on the lock screen in the form of a bar, column, or box and may utilize, for example, up to twice the viewable area of a notification generated by the operating system. As shown, the recommended content in the banner template includes information such as an image of an advertisement (e.g., shoes), a description associated with the advertisement (e.g., price and advertising phrase), and any other appropriate information. The size and appearance (e.g., banner style, bold lines, etc.) can visually distinguish the banner template from other notifications. As with the other templates, a user can interact with the recommended content in the banner template. For example, the user can tap, select, or swipe the recommended content in the banner template, wherein such interaction can cause the computing device to display additional information, launch an application, or some other action.

The template used to display the recommended can be based on the presence of any notifications on the lock screen. For example, in the situation where at least one notification is being displayed on the lock screen, the recommended content can be generated in one of a banner template or a notification template. In the situation where no or zero notifications are being displayed on the lock screen, the recommended content can be generated in a full-screen template. In the situation where there are a few notifications being displayed (e.g., three or less), the recommended content can be generated in a banner template. In the situation where three or more notifications are being displayed on the lock screen, the recommended content can be generated in a notification template. In the situation where ten or more notifications are being displayed, no recommendations may be displayed. It should be noted that other events can trigger the use of one visualization style over another visualization style. It should further be noted that these events may also be used to determine whether recommended content should be displayed.

For example, many operating systems include predefined notification categories to specify the type of notification object being displayed. Example notification categories include alarms and timers, calendar events, incoming direct messages (SMS, instant message, etc.) In accordance with various embodiments, the notification categories can be levered to determine a time to display the recommended content. For example, it may not be desirable to display recommended content when a user is responding to a calendar event, as the user has a specific intent in mind. Instead, the recommended content might be displayed some amount of time after the calendar event. As an example, if the time between when a notification is detected and when a user waking the display screen is less than, for example, fifteen seconds, then recommended content is not displayed.

In another example, operating systems may assign a notification priority to a notification. These priorities can influence 'how' and 'when' notifications should be displayed on a display screen. For example, a priority of "MAX" may be used for a critical or time-sensitive notification. In this example, if the time between a notification being displayed with a "MAX" priority and the user waking the display screen is less than, for example, fifteen seconds, then recommended content is not displayed. In yet another example, the total number of notifications displayed on a lock screen can be used to determine whether to display recommended content. For example, in the situation where, for example, ten or more notifications are present on the lock screen when the display screen is turned on, then recommended content may not be displayed at that time.

In accordance with various embodiments, the advertisements, content, or other information inserted into the template can be tailored for a user of the computing device. This can include tailoring the frequency at which recommended content is displayed (i.e., the rate at which content is displayed or otherwise provided) on the lock screen, the placement of the recommended content on the lock screen, when the recommended content is displayed on the lock screen, and/or the visualization of the recommended content. For example, the time of day to which the recommended content is displayed on the lock screen can be selected to minimize distraction and increase viewership of the recommended content. For example, in the situation where a user utilizes the computing device for a brief period of time in the morning, and more so in the evening, it might be beneficial to increase the display of recommended content on the lock screen at a time the computing device is most likely to be used and/or checked (i.e., in the evening). Providing recommended content during a time the user is infrequently unlocking the computing device or otherwise is attempting to briefly use the device can be distracting and may lead to an unsatisfactory experience.

In various embodiments, the recommended content inserted into the templates can be tailored based on user information as may include the user's demographic information, such as gender, age, marital status, occupation, income level, etc., information indicating usage patterns of the computing device, information indicating applications on the computing device, a physical location of the computing device, a network provider (Wi-Fi and/or telecom) of the computing device, etc. For example, the name of the carrier network used by the computing device can be determined and recommended content can determined based on the carrier network name can be inserted in the template. For example, if the user's carrier is identified, content can be included in the template for a competing carrier. In another example, the computing devices Wi-Fi and/or GPS setting can be determined to tailor content included in the template based on the computing devices physical location. For example, in the situation where the Wi-Fi network is identified with a particular restaurant, recommended content for that restaurant can be inserted into a template and displayed on the lock screen of the computing device. In yet another example, application activity on the computing device can be monitored, where the activity can include notifications, the time of those notifications, etc. The activity can be used to determine a time to display recommended content. For example, the fact that a user is accessing social media websites and/or applications, might indicate that a user of the computing device available to receive content, which can then be displayed on the lock screen of the computing device.

In accordance with various embodiments, other factors can cause the frequency, placement, and/or appearance of advertisements to be adjusted or otherwise modified. For example, if a complaint or other indication is received that indicates that the user is not satisfied with the frequency, placement, and/or appearance of the advertisements, the frequency, placement, and/or appearance at which the advertisements are displayed to the user can be decreased or otherwise modified. In this way, feedback received from the user can be used to adjust the rate at which and/or the placement of the displayed advertisements. Additionally, how often a user clicks, selects and/or otherwise interacts with an advertisement (such as the user's clickthrough rate), and/or any other number of customer behaviors can be used to adjust the advertising frequency (and/or placement and appearance of the advertisements). For example, advertisement frequency can be decreased, and/or placement and/or appearance of advertisements made less intrusive if a user selects or otherwise interacts with the displayed advertisements to increase a clickthrough rate.

Figure 3:
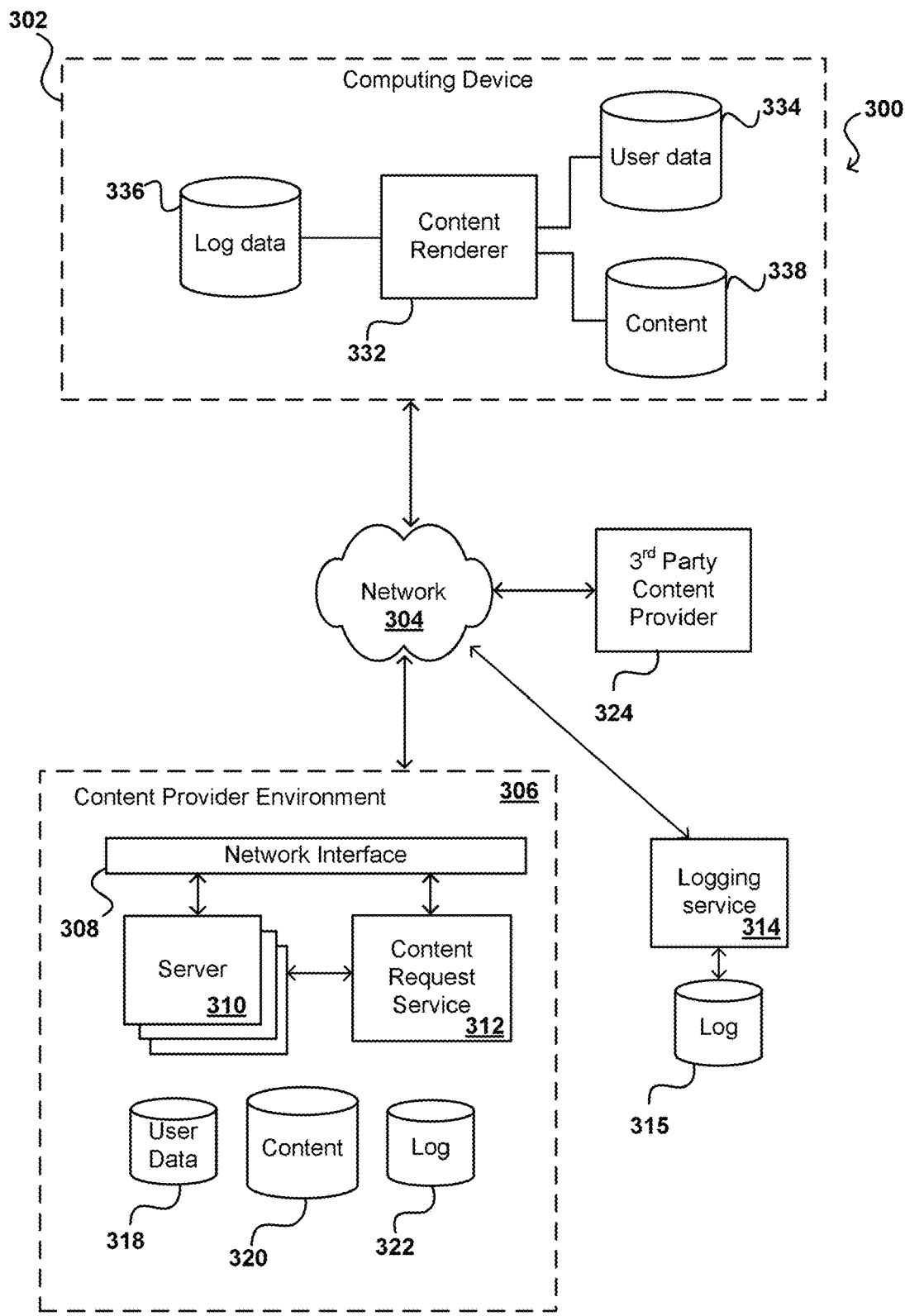
FIG. 3 illustrates an example system for displaying recommended content on a lock screen of a computing device in accordance with various embodiments.

FIG. 3 illustrates an example configuration of a system 300 for rendering recommended content in accordance with various embodiments. In this example, a client device 302 (e.g., similar to computing device 104 in FIG. 1A) is able to receive recommended content across at least one network 304 from an appropriate content provider environment 306. The computing device 302 can generally include a content renderer 332, user data store 334, log data store 336, and content data store 338. The content data store can include the recommended content and display instructions associated with a content provider environment 306 or other such environment that can interpret the display instructions to determine a display schedule by which to display the recommended content on the client device's lock screen. The display instructions can be provided by, for example, a content provider and can include instructions to determine a template to display the recommended content and instructions to determine when to display the recommended content. Updates to the display instructions can be propagated to the client device, where when installed, can be used to modify one of the instructions to determine a template to display the recommended content, instructions to determine when to display the recommended content, or other aspects described herein. The display instructions can instruct the client device to listen for any notifications to be displayed on the lock screen, and based on the presence on any notifications, the time of day, user information, and any other appropriate information, the client device can determine the template to display the recommended content on the lock screen.

The recommended content can include, for example, rich media content, advertisements, graphics, text, selectable elements, etc. The recommended content can be personalized based on user information associated with a user of the client device and can be formatted to optimal display on the client device, taken into consideration various specifications of the client device (e.g., screen size, screen resolution, etc.) The recommended content can be provided by a content provider or other such entity such as an third party content provider. As will be described herein, the client device obtains and stores the recommended content for use. For example, the client device executes the display instructions to determine what template to use to display the recommended content, under what conditions to display the recommended content, when to display the recommended content, and what action to take when the recommended content is selected.

The user data store 334 can include usage information pertaining to the computing device as may include application usage, device settings (e.g., cellular network provider, etc.), as well as user information (e.g., user preferences, unlock log, etc.) The at least one network 304 can include any appropriate network, such as may include the Internet, an Intranet, a local area network (LAN), a cellular network, and the like.

In this example, a request is received to a network interface layer 308 of the content provider environment 306 for recommended content and/or display instructions. The network interface layer can include any appropriate components known or used to receive requests from across a network, such as may include one or more application programming interfaces (APIs) or other such interfaces for receiving such requests. The network interface layer 308 might be owned and operated by the provider, or leveraged by the provider as part of a shared resource or "cloud" offering. The network interface layer can receive and analyze the request from the client device 302, and cause at least a portion of the information in the request to be directed to an appropriate system or service, such as a server 310 (e.g., a Web server or application server), among other such options. At least one server 310 might be used to generate the display instructions and send the recommended content for rendering on the lock screen. To generate the display instructions and the recommended content, the servers or other components of the environment might access one or more data stores, such as a data store 318 that contains information about the various users, and one or more content repositories 320 storing recommended content able to be served to those users. The data store 318 can include, for example, purchase history; customer behavior such as application or service usage; user responsiveness to advertisements such as clickthrough rate; social media information; user complaints about the application, service and/or displayed advertisements; and/or any other information that can be used to indicate user preference to a type of advertisement.

A content request service 312 can be configured to provide information to include in the recommended content, and can include certain parameters regarding presenting recommended content. For instance, the content request service 312 can specify rules that affect the frequency at which content is displayed, the types of notifications the recommended content is displayed with, etc. Once the appropriate components of the content provider environment 306 have determined the appropriate information, a response can be returned to the client device 302 over the network. This can include any recommended content, as well as code and/or script (e.g., display instructions) for rendering the recommended content. In accordance with various embodiments, an advertisement can be one type of recommended content.

In various embodiments, the third party content provider 324 can be, a social media network, news network, an ad network (e.g., a company that connects advertisers to publishers, such as websites or application developers, that host ads), an ad mediator (e.g., an ad tracking platform that enables the allocation of advertising inventory across multiple ad networks), an ad exchange (e.g., a technology platform that facilitates automated auction-based pricing and buying in real-time between advertiser demand and publisher ad supply), or the like. The third party content provider 324 can include or at least be in communication with an advertising manager, the content request service, or other appropriate service, which can include any combination of devices and/or processes operable to encompass, monitor, and/or control a number of different algorithms and components for selecting recommended content. Where the recommended content is to be provided from the third party content provider 324, the content renderer, or other component on computing device 302 in some embodiment can be used to submit a request to the third party content provider 324 across the network, which can return a response including the recommended content. The request can include any appropriate information for selecting recommended content. For example, the information can include usage profile and user information (such as demographic information), log information for a frequency of displayed recommended content, the placement of displayed recommended content, and/or the appearance of displayed recommended content, among other information.

In some embodiments, the display instructions can cause a request to be submitted to the content request service 312, or other such component, that can communicate with the third party content provider 324 which can then provide the recommended content for submission to the computing device 302. When the recommended content is loaded on the lock screen, the display instructions executing on the client device 302 can analyze the properties of the recommended content displayed to determine whether the user has viewed or otherwise interacted with the recommended content. The user interaction with the recommended content (e.g., selecting the recommended content), the downloaded advertisements, the advertisements view, the template used to display the recommended content (e.g., full screen template, notification template, and banner template), and other information can be stored in log data store 336. The information can be provided to the content provider environment, third party content provider, or some other entity.

The display instructions can then cause at least one call or request to be submitted to a least one logging service 314, within or outside the provider environment 306, where the call or request included information about the visibility of the advertising, interaction metrics (e.g., a time of day, template to display the recommended content, etc.), among other such options. The information can then be stored to log database 315 or similar location for subsequent analysis. In some cases, the information in the log database 315 will periodically be pulled and transformed to a format that can be stored to a table in the user data store 318, or other data repository or log data store 322, for reporting or statistical analysis with other data, enabling various types of reporting and analysis to be performed across various types of data.

Figure 4:
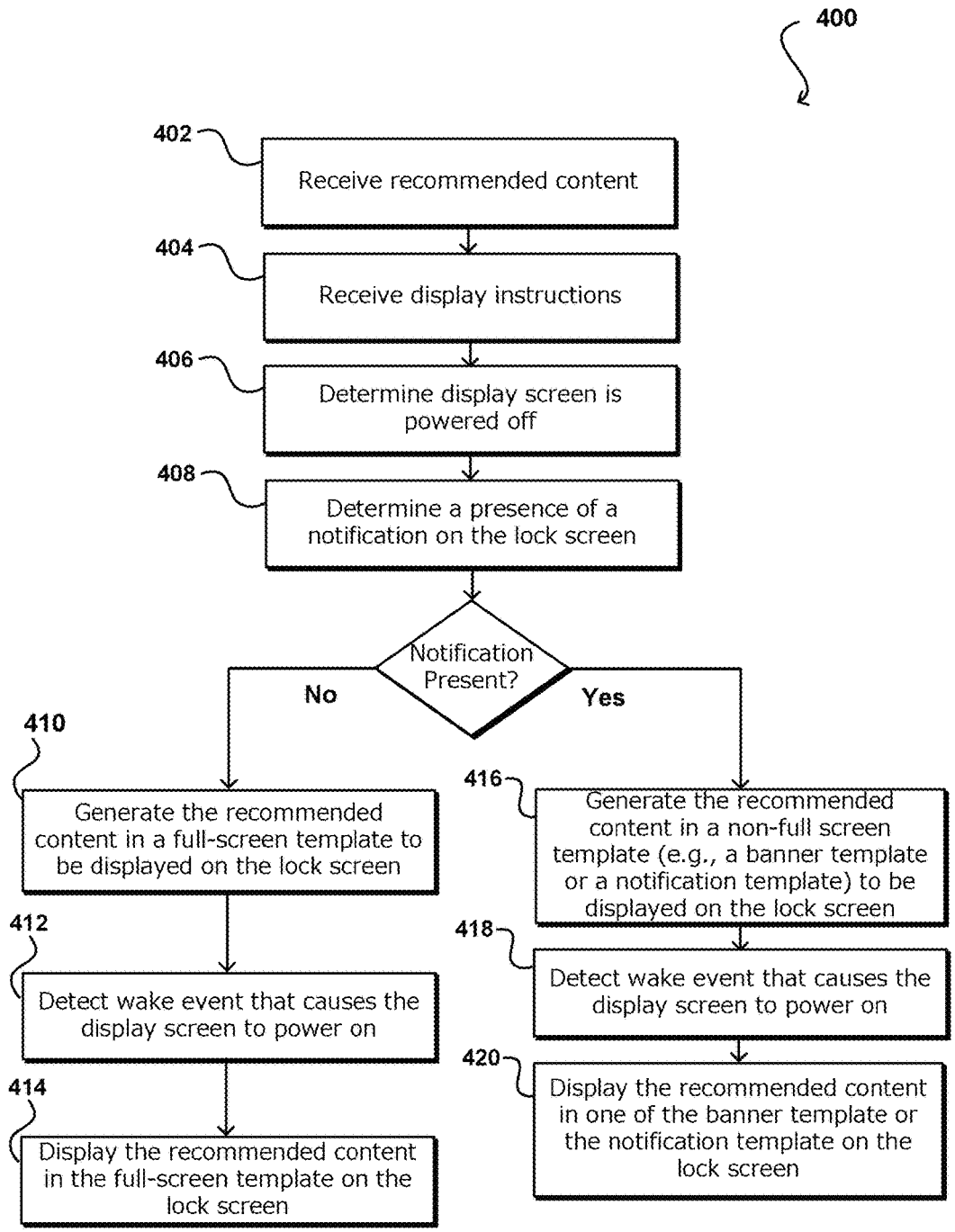
FIG. 4 illustrates an example process for displaying recommended content on a lock screen of a computing device in accordance with various embodiments.

FIG. 4 illustrates an example process 400 for displaying recommended content on a lock screen of a computing device in accordance with various embodiments. It should be understood that, for any process described herein, that there can be additional or fewer steps performed in similar or alternative orders, or in parallel, within the scope of the various embodiments unless otherwise stated. In this example, a component operating on a computing device or other software code or application, can be used to determine recommended content that includes advertisements and/or other content to display on a lock screen of a computing device. As described, the recommended content can be associated with a content provider or other such entity. In this example, the content provider associated with a cloud-based recommendation service that generates recommended content based at least in part on a customer profile associated with the computing device, the customer profile associated with at least one of customer preferences, customer purchase history, customer search history, customer media consumption history, geographic location of the computing device, customer physical activity data, limited time discounts provided by the first content provider, customer wish list with the first content provider.

In this example, recommended content is obtained 402 for display on a lock screen of a computing device. The recommended content can include, for example, rich media content, advertisements, and other content a user or other object can interact with. The recommended content as well as any advertisements and/or other information (e.g., advertisement images, advertisement description, etc.) can be stored. Display instructions can be received 404. The display instructions can be used by the computing device to determine a template to display the recommended content and a display schedule by which the recommended content is to be displayed. For example, display instructions can be used to cause the computing device to display the recommended content at specific times, under specific conditions, and/or in response to an event. As described herein, a content provider or other entity can provide such recommended content, advertisement and/or other information, display instructions to the computing device.

The display screen of the computing device is determined at 406 to be in a powered off state. In a powered off state, the lock screen cannot be accessed until the display screen is powered on. As described, a lock screen is a type of graphical user interface (GUI) that is displayed on a display screen when the display screen is "locked," or programmed not to respond to most touches on the display screen. The lock screen can be displayed upon detecting an input that "wakes" the display screen. An example input can be a selection of a physical button, a voice input, movement of the computing device, system notifications being displayed by the computing device, etc. Upon waking the device, the display screen is powered on and the lock screen is displayed. The presence of a notification to be displayed on the lock screen is determined 408. While the display screen is off, the determination can be repeated at a predetermined interval and for each interval the presence of a notification to be displayed can be determined. For example, in certain situations, a notification might be displayed on the display screen for a first interval but for a second interval (or some other interval) the notification might have been cleared by the computing device. In this example, for the first interval, the recommended content can be generated in a full-screen template. However, once the notification was cleared and now that there are no notifications to be displayed on the lock screen, the recommended content can be generated in one of a banner template or a notification template on the lock screen. Example notifications include missed text message notifications, missed call notifications, calendar event notifications, operating system notifications, network notifications, among others. In the situation where zero notifications are determined to be displayed on the lock screen, the recommended content can be generated 410 by inserting the recommended content into a full-screen template for display on the lock screen. In response to detecting 412 a wake event that causes the display screen to power on, the recommended content is displayed 414 in the full-screen template on the lock screen. In the situation where at least one notification is determined to be displayed on the lock screen, then the recommended content is generated 416 in a non-full screen template (e.g., one of a banner template or a notification template) by inserting the recommended content into the non-full screen template. Whether the banner template or the notification template is used can be based on, for example, the number of notifications to be displayed on the display screen. For example, in the situation where there are a few notifications being displayed (e.g., three or less), the recommended content can be generated in a banner template. In the situation where three or more notifications are being displayed on the lock screen, the recommended content can be generated in a notification template. In the situation where ten or more notifications are being displayed, no recommendations may be displayed. Other factors can include the time of day, the number of lock screens per day, computing device usage information, etc.

In response to detecting 418 a wake event that causes the display screen to power on, the recommended content is displayed 420 in one of the non-full screen template (e.g., the banner template or the notification template.) As described, a user can interact with the recommended content. For example, the user can tap, select, swipe, or otherwise interact with the recommended content in a same or similar manner as with other notifications. Selecting the recommended notification can cause the computing device to display additional information, launch an application, or some other action associated with the recommended content.

Figure 5:
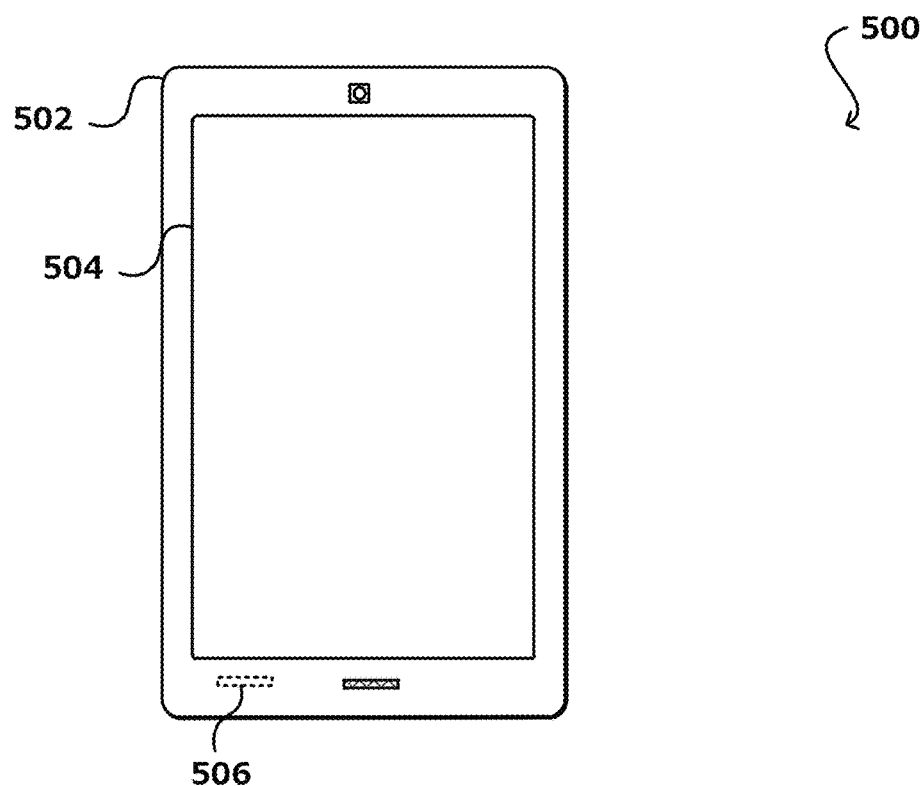
FIG. 5 illustrates an example portable computing device that can be used in accordance with various embodiments.

FIG. 5 illustrates an example computing device 500 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), automobile displays, televisions and/or devices that connect to them (e.g., set top boxes), and portable media players, among others.

Figure 6:
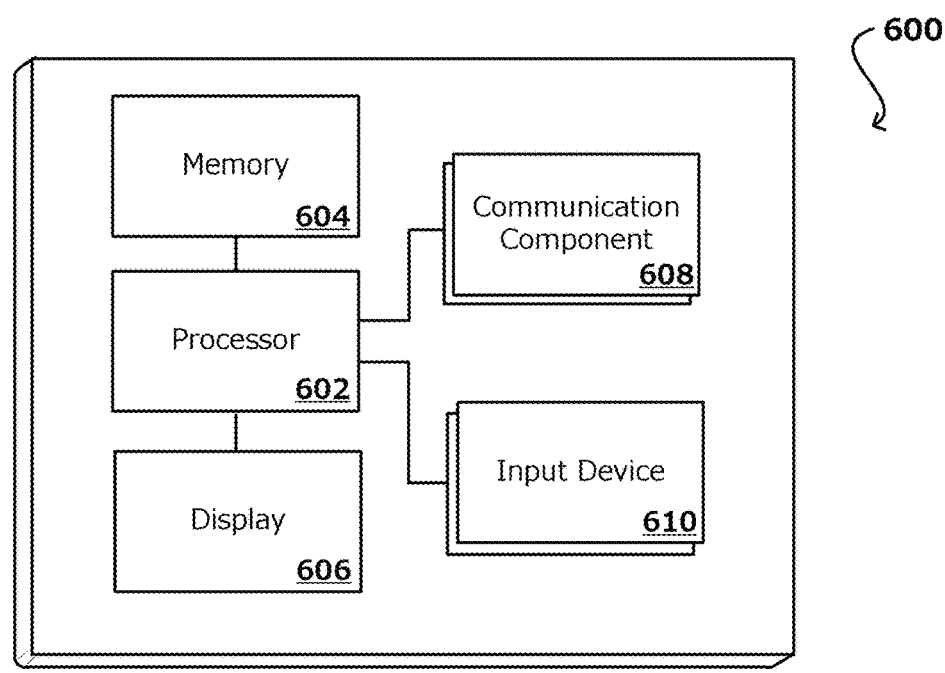
FIG. 6 illustrates an example set of basic components of a portable computing device, such as the device described with respect to FIG. 5.

In this example, the computing device 500 (e.g., similar to computing device 104 in FIG. 1A) has a display screen 504 and an outer casing 502. The display screen under normal operation will display information to a user (or viewer) facing the display screen (e.g., on the same side of the computing device as the display screen). As discussed herein, the device can include one or more communication components 506, such as may include a cellular communications subsystem, Wi-Fi communications subsystem, BLUETOOTH communication subsystem, and the like. FIG. 6 illustrates a set of basic components of a computing device 600 such as the device 500 described with respect to FIG. 5. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device typically will include at least one type of display element 606, such as a touch screen, electronic ink (e-ink), organic light emitting diode (OLED) or liquid crystal display (LCD), although devices such as portable media players might convey information via other means, such as through audio speakers. The device can include at least one communication component 608, as may enabled wired and/or wireless communication of voice and/or data signals, for example, over a network such as the Internet, a cellular network, a Wi-Fi network, BLUETOOTH, and the like. The device can include at least one additional input device 610 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 7:
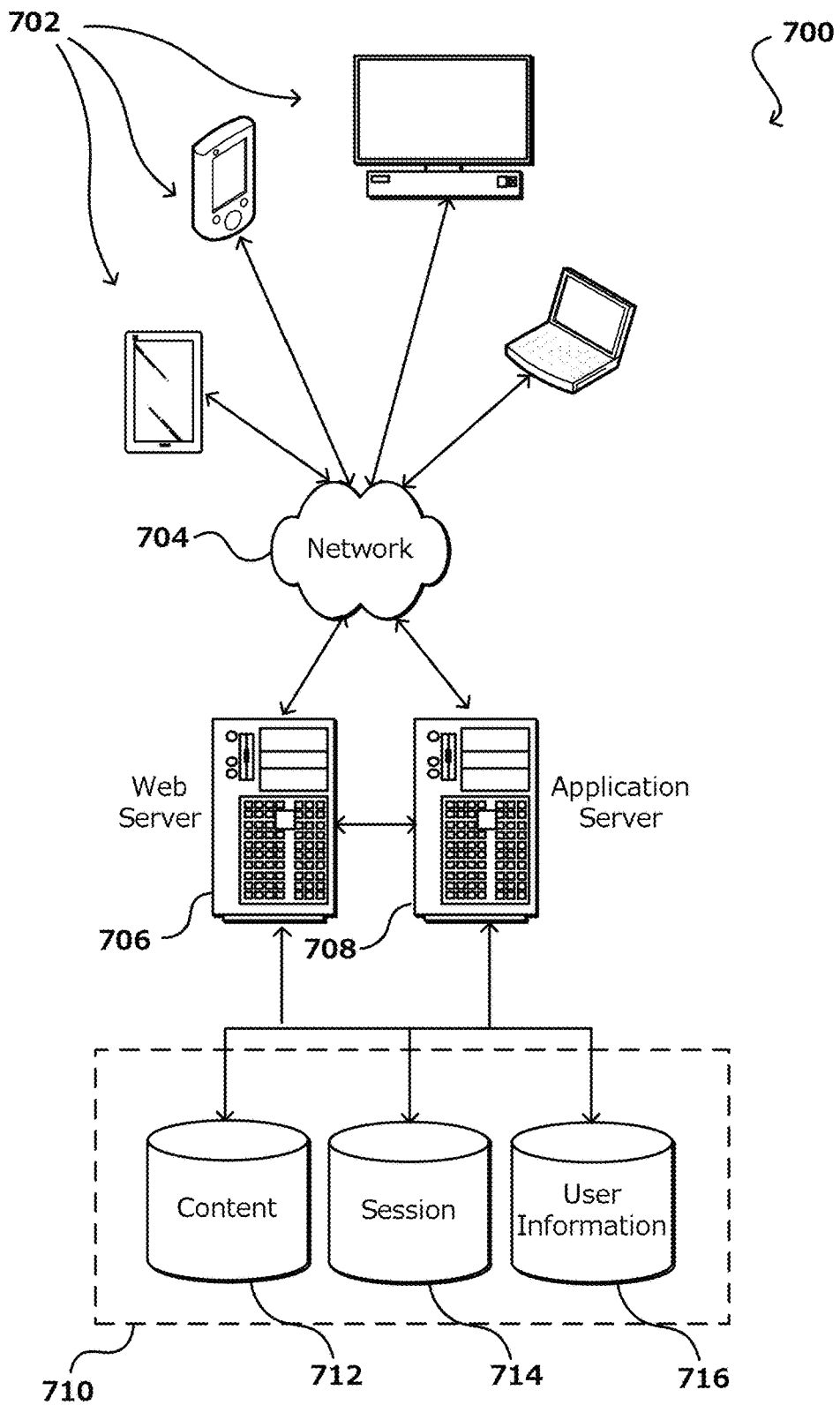
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client devices 702 (e.g., similar to computing device 104 in FIG. 1A), which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device.

Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
   receiving recommended content for display on a lock screen of a computing device, the recommended content associated with a first entity;
   determining a number representing how many notifications associated with other entities are to be displayed on the lock screen;
   determining a template to be used to present the recommended content based at least in part on the number; and
   enabling for display lock screen content based at least in part on the template and recommended content, the template including a selectable element to view additional content.

2. The computer implemented method of claim 1, further includes:
   detecting a wake event that causes a display screen of the computing device to power on;
   generating the lock screen content by inserting the recommended content in the template;
   receiving a selection of the selectable element; and
   storing information associated the selection, the information including at least one of a time of the selection or computing device usage information.

3. The computer implemented method of claim 1, further includes:
   receiving a display schedule that includes instructions used to determine a time to display the recommended content;
   determining a current time;
   determining that the current time is within a predetermined time segment;
   detecting a wake event that causes a display screen of the computing device to power on;
   generating the lock screen content by inserting the recommended content in the template; and
   displaying the lock screen content.

4. The computer implemented method of claim 1, further includes:
   receiving application usage information associated with the computing device; and
   determining a time to enable for display the lock screen content based at least in part on the application usage information.

5. The computer implemented method of claim 1, further includes:
   determining that the number is below a first threshold; and
   generating the lock screen content by inserting the recommended content in a full-screen template.

6. The computer implemented method of claim 1, further includes:
   determining that the number meets a first threshold; and
   generating the lock screen content by inserting the recommended content in a non-full screen template.

7. The computer implemented method of claim 1, further includes:
   receiving usage information associated with the computing device; and
   determining additional information based at least in part on the usage information;
   generating the lock screen content by inserting the recommended content and additional information in the template, wherein the additional information includes at least one of a product description, pricing, user ratings, or user reviews, and wherein the usage information includes at least one of an indication of a network provider, a geographic location of the computing device, search history, shopping history, user preferences.

8. The computer implemented method of claim 7, wherein the first entity is associated with a cloud-based recommendation service that generates recommended content based at least in part on customer profile associated with the computing device, the customer profile associated with at least one of customer preferences, customer purchase history, customer search history, customer media consumption history, geographic location of the computing device, customer physical activity data, limited time discounts provided by the first entity, customer wish list with the first entity.

9. The computer implemented method of claim 1, further includes:
   determining a category of at least one notification to be displayed on the lock screen; and
   enabling enable for display the lock screen content based at least in part on the category.

10. The computer implemented method of claim 1, further comprising:
    maintaining a log of a total number of times the lock screen is accessed;
    generating an updated usage profile based at least in part on the log; and
    generating a first updated frequency of providing the recommended content based at least in part on the updated usage profile.

11. The computer implemented method of claim 10, further comprising:
    generating a second updated frequency based at least in part on a profitability metric, wherein the profitability metric indicates an amount of revenue generated based at least in part on a number of recommended content displayed on the lock screen of the computing device.

12. A computing system, comprising:
    at least one processor; and
    memory including instructions that, when executed by the processor, enable the computing system to:
    receive recommended content for display on a lock screen of a computing device, the recommended content associated with a first entity;
    determine a number representing how many notifications associated with other entities are to be displayed on the lock screen;
    determine a template to be used to present the recommended content based at least in part on the number; and
    enable for display lock screen content based at least in part on the template and recommended content, the template including a selectable element to view additional content.

13. The computing system of claim 12, wherein the instructions, when executed further enable the computing device to:
    detect a wake event that causes a display screen of the computing device to power on;

generate the lock screen content by inserting the recommended content in the template;

receive a selection of the selectable element; and store information associated the selection, the information including at least one of a time of the selection or computing device usage information.

14. The computing system of claim 12, wherein the instructions, when executed to enable for display the recommended content, further enable the computing device to:

receive a display schedule that includes instructions used to determine a time to display the recommended content;

determine a current time; and determine that the current time is within a predetermined time segment.

15. The computing system of claim 12, wherein the instructions, when executed further enable the computing device to:

receive application usage information associated with the computing device; and determine a time to enable for display the lock screen content based at least in part on the application usage information.

16. The computing system of claim 12, wherein the instructions, when executed further enable the computing device to:

determine that the number is below a first threshold; and generate the lock screen content by inserting the recommended content in a full-screen template.

17. A non-transitory computer readable storage medium storing instructions that, when executed by at least one processor of a computing device, cause the computing device to:

receive recommended content for display on a lock screen of a computing device, the recommended content associated with a first entity;

determine a number representing how many notifications associated with other entities are to be displayed on the lock screen;

determine a template to be used to present the recommended content based at least in part on the number; and enable for display lock screen content based at least in part on the template and recommended content, the template including a selectable element to view additional content.

18. The non-transitory computer readable storage medium of claim 17, wherein the instructions, when executed by the at least one processor, further cause the computing device to:

detect a wake event that causes a display screen of the computing device to power on;

generate the lock screen content by inserting the recommended content in the template;

receive a selection of the selectable element; and store information associated the selection, the information including at least one of a time of the selection or computing device usage information.

19. The non-transitory computer readable storage medium of claim 17, wherein the instructions, when executed by the at least one processor, further cause the computing device to:

receive a display schedule that includes instructions used to determine a time to display the recommended content;

determine a current time; and determine that the current time is within a predetermined time segment.

20. The non-transitory computer readable storage medium of claim 17, wherein the instructions, when executed by the at least one processor, further cause the computing device to:

receive application usage information associated with the computing device; and determine a time to enable for display the lock screen content based at least in part on the application usage information.

* * * * *